US012784225B2

(12) United States Patent
Liu et al.

(10) Patent No.: US 12,784,225 B2
(45) Date of Patent: Nov. 3, 2026

(54) IMAGE SEGMENTATION APPARATUS AND IMAGE SEGMENTATION METHOD

(71) Applicant: CANON KABUSHIKI KAISHA, Tokyo (JP)

(72) Inventors: Shuolin Liu, Beijing (CN); Yunxin Zhong, Beijing (CN); Sha Wang, Beijing (CN); Xueru Zhang, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 18/766,972

(22) Filed: Jul. 9, 2024

(65) Prior Publication Data

US 2025/0022138 A1 Jan. 16, 2025

(30) Foreign Application Priority Data

Jul. 14, 2023 (CN) ......................... 202310876025.7

(51) Int. Cl.
*G06T 7/11* (2017.01)

(52) U.S. Cl.
CPC ...... *G06T 7/11* (2017.01); *G06T 2207/10081* (2013.01); *G06T 2207/20081* (2013.01); *G06T 2207/20084* (2013.01); *G06T 2207/30004* (2013.01)

(58) Field of Classification Search
CPC . G06T 7/194; G06T 7/11; G06T 2207/10081; G06T 2207/20081; G06T 2207/20084; G06T 2207/20132; G06T 2207/30004; G06N 3/08; G06N 5/041
See application file for complete search history.

(56) References Cited

U.S. PATENT DOCUMENTS

| | | | | |
|---|---|---|---|---|
| 8,014,575 | B2 * | 9/2011 | Weiss | A61B 5/0042 382/128 |
| 8,929,622 | B2 * | 1/2015 | Galigekere | G06T 7/90 382/128 |
| 9,836,839 | B2 * | 12/2017 | Champlin | G06V 10/56 |
| 10,061,972 | B2 * | 8/2018 | Champlin | G06V 10/56 |
| 10,073,602 | B2 * | 9/2018 | Perry | G06F 3/04845 |
| 10,354,416 | B2 * | 7/2019 | Natsuaki | G01R 33/5635 |
| 10,682,098 | B2 * | 6/2020 | McLaughlin | A61B 5/0035 |

(Continued)

OTHER PUBLICATIONS

Du et al, 2019, "Patch-based adaptive weighting with segmentation and scale (PAWSS) for visual tracking in surgical video" (pp. 120-135) (Year: 2019).*

*Primary Examiner* — Manav Seth
(74) *Attorney, Agent, or Firm* — Oblon, McClelland, Maier & Neustadt, L.L.P.

(57) ABSTRACT

An image segmentation apparatus according to an embodiment includes processing circuitry configured: to calculate a variable field-of-view mathematical function capable of adaptively generating fields of view having corresponding sizes, with respect to a plurality of segmentation targets included in an image; to generate patches having corresponding sizes, with respect to the plurality of segmentation targets, by using the variable field-of-view mathematical function; and to obtain a segmentation result of the plurality of segmentation targets, by carrying out an inference on the image while using a segmentation model trained with the patches.

11 Claims, 11 Drawing Sheets

(56) References Cited

U.S. PATENT DOCUMENTS

| | | | | |
|---|---|---|---|---|
| 10,783,697 | B2 * | 9/2020 | Huang | G06T 7/11 |
| 11,100,647 | B2 * | 8/2021 | Nikolov | A61B 5/7267 |
| 11,172,902 | B2 * | 11/2021 | Gemmel | G06T 7/0012 |
| 11,232,569 | B2 * | 1/2022 | de Vaan | G06T 7/12 |
| 11,551,353 | B2 * | 1/2023 | Golden | G06N 3/09 |
| 11,676,281 | B2 * | 6/2023 | Nikolov | A61B 5/7267<br>382/131 |
| 11,972,571 | B2 * | 4/2024 | Liu | G06T 7/11 |
| 2023/0386067 | A1 * | 11/2023 | De Nigris | A61B 5/055 |
| 2025/0131562 | A1 * | 4/2025 | Golden | G06V 10/82 |

* cited by examiner

IMAGE SEGMENTATION APPARATUS AND IMAGE SEGMENTATION METHOD

CROSS-REFERENCE TO RELATED APPLICATIONS

This application is based upon and claims the benefit of priority from Chinese Patent Application No. 202310876025.7, filed on Jul. 14, 2023, the entire contents of all of which are incorporated herein by reference.

FIELD

Embodiments described herein relate generally to an image segmentation apparatus and an image segmentation method.

BACKGROUND

In medical image analyses, human organs and seats of diseases often exhibit multi-scale features. More specifically, the sizes of imaged elements (hereinafter, "targets") have a large distribution. For example, the lung trachea can be branched into approximately 24 classes ranging from the bronchi in class 1 to the alveoli in the last class. Further, a scale distribution of pulmonary nodules may range from 0 mm to 30 mm or larger. As another example, as for the size of a kidney tumor, the diameter may range from smaller than 3 cm to approximately 20 cm to 30 cm. An important goal in medical image segmentation processes lies in how to enhance segmentation effects on targets on mutually-different scales.

Medical image segmentation can be divided into two schemes, namely, fully-automatic and semi-automatic schemes. Fully-automatic medical image segmentation is a technique by which, after a designated image is input, a segmentation result (a tumor, an organ, a tissue, or the like) is automatically obtained by directly using a model. In fully-automatic medical image segmentation tasks, because segmentation targets always have large differences in shapes, scales, and positions thereof, it is difficult to obtain accurate segmentation results for all the segmentation targets that have the large differences in the shapes, scales, and positions thereof.

In contrast, semi-automatic medical image segmentation is used more commonly and is a technique by which, for example, a user at first manually designates a segmentation position or range, so that the designated position or range is subsequently segmented by using a model. In semi-automatic medical image segmentation tasks, the designation of the segmentation range is important. When too large a Field of View (FOV) is designated, precision levels of segmentation for small targets tend to be insufficient, and computation resources may be spent wastefully. Conversely, when too small an FOV is designated, coverage of the targets tends to be incomplete.

DETAILED DESCRIPTION

Figure 1:
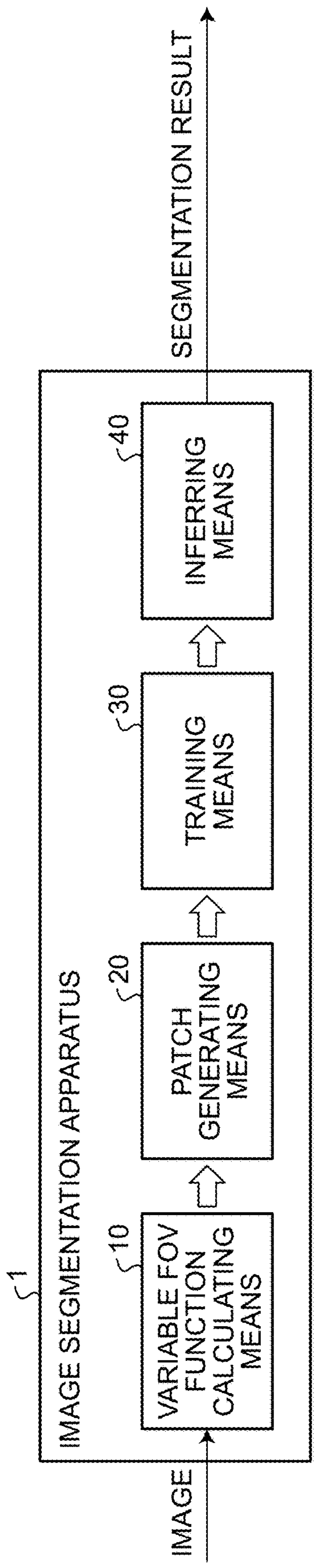
FIG. 1 is a block diagram illustrating an exemplary configuration of an image segmentation apparatus according to an embodiment.

Described in the present embodiments are an image segmentation apparatus and a method using adaptive FOVs for segmenting multi-scale targets. For example, an image segmentation apparatus according to an embodiment includes: an adaptive FOV calculating unit configured to obtain an adaptive FOV mathematical function (hereinafter, simply "adaptive FOV function") through a calculation and a fitting process, with respect to target features on mutually-different scales; a patch generating unit configured to generate patches corresponding to mutually-different FOVs with respect to the targets on the mutually-different scales; a model training unit configured, with respect to the targets on the mutually-different scales, to train a model according to an adaptive method, while using the patches for the mutually-different FOVs; and a model inferring unit configured to obtain an initial segmentation result by using a coarse model, to calculate an optimal FOV on the basis of the initial segmentation result, and to subsequently obtain a final inference result by further carrying out an inference on the optimal FOV while using a fine model.

More specifically, an aspect of the embodiments provides an image segmentation apparatus that segments a plurality of segmentation targets included in an image, the image segmentation apparatus including: a variable FOV function calculating means for calculating a variable FOV mathematical function (hereinafter, simply "variable FOV function") capable of adaptively generating fields of view having corresponding sizes, with respect to the plurality of segmentation targets; a patch generating means for generating patches having corresponding sizes, with respect to the plurality of segmentation targets, by using the variable FOV function calculated by the variable FOV function calculating means; and an inferring means for obtaining a segmentation result of the plurality of segmentation targets, by carrying out an inference on the image while using a segmentation model trained with the patches generated by the patch generating means.

Another aspect of the embodiments provides an image segmentation method for segmenting a plurality of segmentation targets included in an image, the image segmentation method including: a variable FOV function calculating step of calculating a variable FOV function capable of adaptively generating fields of view having corresponding sizes, with respect to the plurality of segmentation targets; a patch generating step of generating patches having corresponding sizes, with respect to the plurality of segmentation targets, by using the variable FOV function calculated at the variable FOV function calculating step; and an inferring step of obtaining a segmentation result of the plurality of segmentation targets, by carrying out an inference on the image while using a segmentation model trained with the patches generated at the patch generating step.

According to at least one aspect of the embodiments, the variable FOV function is calculated with respect to the segmentation targets having the mutually-different sizes, and further, the image is segmented after generating the patches having the sizes corresponding to the scales of the segmentation targets, by using the generated variable FOV function. As a result, the present embodiments are suitable for segmentation tasks in which the segmentation targets have large differences in the scales and shapes thereof. It is therefore possible to solve the technical problem where precision levels of the segmentation may be insufficient for small targets, while segmentation for large targets may be incomplete. It is thus possible to obtain segmentation results having high levels of precision.

Further, the present embodiments are applicable to semi-automatic segmentation algorithms and fully-automatic segmentation algorithms. Also, the variable FOV function calculating means of the present disclosure may alone be applied to other detection processes and segmentation models.

Exemplary embodiments of an image segmentation apparatus, an image segmentation method, and a storage medium will be explained in detail below, with reference to the accompanying drawings. The image segmentation apparatus, the image segmentation method, and the storage medium of the present embodiments are not limited by the embodiments described below. In the following description, some of the constituent elements that are the same as each other will be referred to by using the same reference characters, and duplicate explanations thereof will be omitted.

To begin with, an outline of a segmentation apparatus according to an embodiment will be explained. An image segmentation apparatus according to the embodiment may be provided in the form of a medical image diagnosis apparatus such as an ultrasound diagnosis apparatus, a Computed Tomography (CT) imaging apparatus, or a Magnetic Resonance Imaging (MRI) apparatus or may be independently provided in the form of a workstation or the like.

FIG. 1 is a block diagram illustrating an exemplary configuration of the image segmentation apparatus according to the embodiment. An image segmentation apparatus 1 according to the embodiment is configured to carry out segmentation on segmentation targets included in an image, by using a deep learning neural network. As illustrated in FIG. 1, the image segmentation apparatus 1 includes, among others, a variable FOV function calculating means 10, a patch generating means 20, a training means 30, and an inferring means 40. The variable FOV function calculating means 10 is configured to receive the image to be processed and to calculate a variable FOV function for adaptively generating FOVs that have corresponding sizes, with respect to a plurality of segmentation targets having mutually-different sizes, the variable FOV function using, as a variable, statistical values obtained by statistically calculating shape features of the plurality of segmentation targets. The patch generating means 20 is configured to generate, with respect to the segmentation targets, patches having sizes respectively corresponding to scales of the segmentation targets, by using the variable FOV function calculated by the variable FOV function calculating means 10. The training means 30 is configured to train a segmentation model by using the patches generated by the patch generating means 20. The inferring means 40 is configured to obtain a final segmentation result of the segmentation targets, by carrying out an inference on the image while using the segmentation model trained by the training means 30.

For example, the image segmentation apparatus 1 according to the embodiment may be included in an image segmentation apparatus for an ultrasound diagnosis apparatus or the like. In that situation, the image segmentation apparatus 1 further includes a controlling unit, an ultrasound probe, a display, an input/output interface, an apparatus main body, and/or the like (not illustrated). The variable FOV function calculating means 10, the patch generating means 20, the training means 30, and the inferring means 40 are included in the controlling unit, while being communicably connected to the ultrasound probe, the display, the input/output interface, the apparatus main body, and/or the like. Because configurations, operational functions, and the like of the controlling unit, the ultrasound probe, the display, the input/output interface, and the apparatus main body are well known among persons skilled in the art, detailed explanations thereof will be omitted. Although the example was explained in which the image segmentation apparatus 1 is included in the ultrasound diagnosis apparatus, the image segmentation apparatus 1 may similarly be included in another type of medical image diagnosis apparatus such as a CT imaging apparatus or an MRI apparatus.

Figure 2:
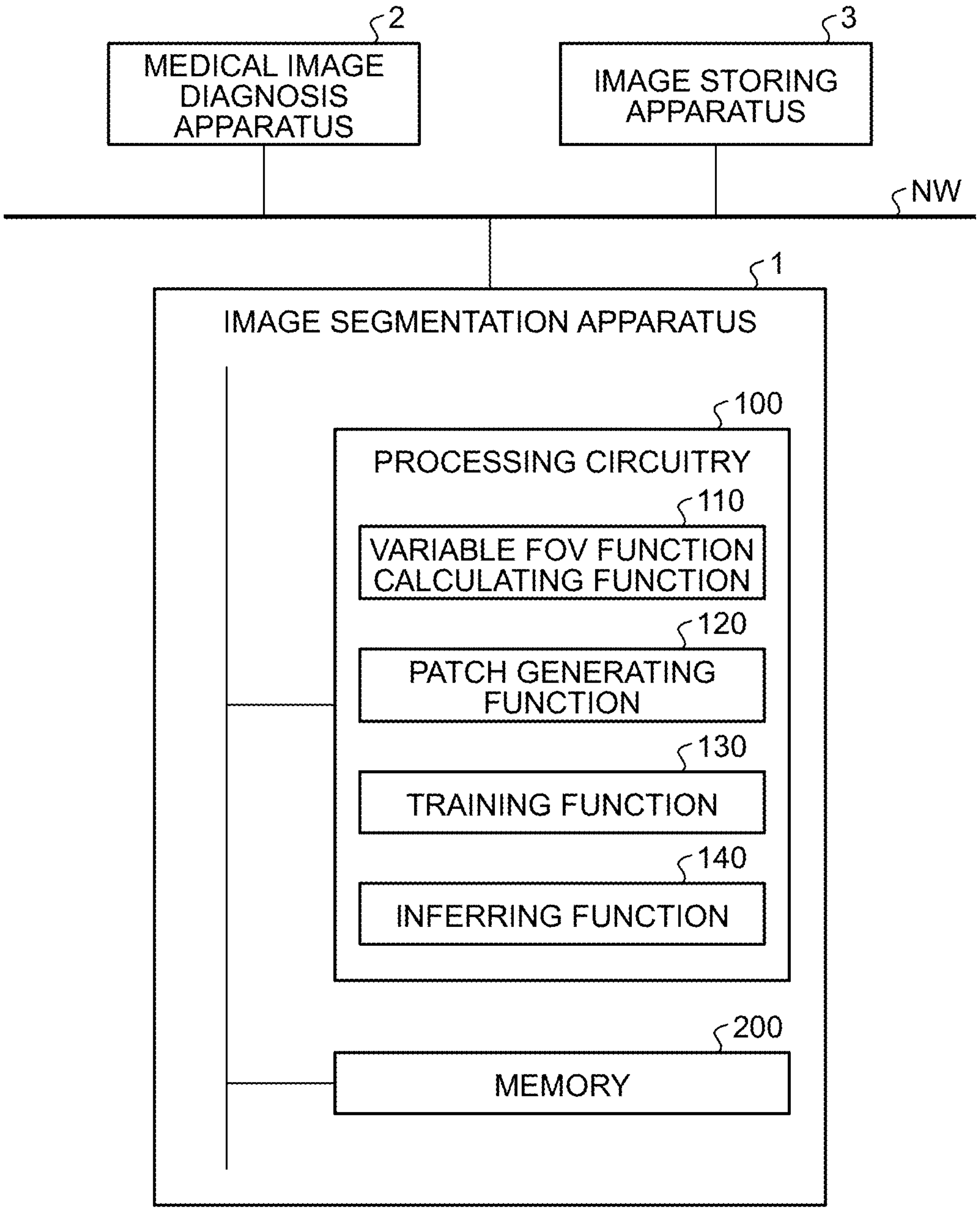
FIG. 2 is a block diagram illustrating an exemplary configuration of a medical image processing system according to the embodiment.

FIG. 2 illustrates an exemplary configuration of the image segmentation apparatus 1 illustrated in FIG. 1. For example, the means illustrated in FIG. 1 are realized by processing circuitry 100 presented in FIG. 2.

More specifically, FIG. 2 illustrates a medical image processing system including the image segmentation apparatus 1. The medical image processing system in FIG. 2 includes the image segmentation apparatus 1, a medical image diagnosis apparatus 2, and an image storing apparatus 3, which are communicably connected together via a network NW.

The medical image diagnosis apparatus 2 is an apparatus configured to acquire a medical image from an examined subject (hereinafter, "patient"). As mentioned above, possible types of the medical image diagnosis apparatus 2 are not particularly limited. For example, it is possible to use a modality apparatus of an arbitrary type, such as a CT imaging apparatus or an MRI apparatus. Furthermore, the medical image processing system may include a plurality of types of medical image diagnosis apparatuses 2.

The image storing apparatus 3 is an apparatus configured to store therein the medical image acquired by the medical image diagnosis apparatus 2. The present embodiment will be explained on the assumption that the medical image may include data acquired from the patient by the medical image diagnosis apparatus 2 and various types of data generated from the acquired data. For instance, in an example of a CT imaging apparatus, raw data is acquired from the patient by performing a CT scan; a reconstructed image is reconstructed from the raw data; a display-purpose image is generated by performing various types of image processing processes on the reconstructed image; and the display-purpose image is displayed on a display. In the following description, the raw data, the reconstructed image, and the display-purpose image will not particularly be distinguished from one another and will simply be referred to as the "medical image" in the explanations. For example, the image storing apparatus 3 may be a server of a Picture Archiving and Communication System (PACS).

As illustrated in FIG. 2, for example, the image segmentation apparatus 1 includes the processing circuitry 100 and a memory 200. The elements included in the image segmentation apparatus 1 may be adjusted as appropriate. For example, a display, an input/output interface, and/or the like may be included.

The memory 200 is realized, for example, by using a semiconductor memory element such as a Random Access Memory (RAM) or a flash memory, or a hard disk, an optical disk, or the like. For example, the memory 200 is configured to store therein the medical image acquired by the medical image diagnosis apparatus 2 and programs used by the circuitry included in the image segmentation apparatus 1 to realize operational functions thereof. The memory 200 may be realized by using a server group (a cloud) connected to the image segmentation apparatus 1 via the network NW.

The processing circuitry 100 includes a variable FOV function calculating function 110, a patch generating function 120, a training function 130, and an inferring function 140. For example, the processing circuitry 100 is configured to function as the variable FOV function calculating function 110, by reading and executing a program corresponding to the variable FOV function calculating function 110, from the memory 200. Similarly, the processing circuitry 100 is configured to function as the patch generating function 120, the training function 130, and the inferring function 140.

The variable FOV function calculating function 110 realized by the processing circuitry 100 is an example of the variable FOV function calculating means 10 illustrated in FIG. 1 and is also an example of a variable FOV function calculating unit. The patch generating function 120 is an example of the patch generating means 20 and is also an example of a patch generating unit. The training function 130 is an example of the training means 30 and is also an example of a training unit. The inferring function 140 is an example of the inferring means 40 and is also an example of an inferring unit.

In the image segmentation apparatus 1 illustrated in FIG. 2, processing functions are stored in the memory 200 in the form of computer-executable programs. The processing circuitry 100 is a processor configured to realize the functions corresponding to the programs by reading and executing the programs from the memory 200. In other words, the processing circuitry 100 that has read the programs has the functions corresponding to the read programs.

Although the example was explained with reference to FIG. 2 in which the single piece of processing circuitry (i.e., the processing circuitry 100) is configured to realize the variable FOV function calculating function 110, the patch generating function 120, the training function 130, and the inferring function 140, it is also acceptable to structure the processing circuitry 100 by combining together a plurality of independent processors, so that the functions are realized as a result of the processors executing the programs. Further, the processing functions of the processing circuitry 100 may be realized as being distributed among or integrated into one or more pieces of processing circuitry as appropriate.

Further, the processing circuitry 100 may be configured to realize the functions by using a processor of an external apparatus connected via the network NW. For example, the processing circuitry 100 may be configured to realize the functions illustrated in FIG. 2, by reading and executing the programs corresponding to the functions from the memory 200, while using a server group (a cloud) connected to the image segmentation apparatus 1 via the network NW as computation resources.

The term "processor" used in the above explanations denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). The one or more processors are configured to realize the functions by reading and executing the programs saved in the memory 200.

With reference to FIG. 2, the example was explained above in which the single memory (i.e., the memory 200) is configured to store therein the programs corresponding to the processing functions. However, possible embodiments are not limited to this example. For instance, another configuration is also acceptable in which a plurality of memories 200 are provided in a distributed manner, so that the processing circuitry 100 reads corresponding programs from the individual memories 200. Further, instead of having the programs saved in one or more memories, it is also acceptable to directly incorporate the programs in the circuitry of the one or more processors. In that situation, the one or more processors are configured to realize the functions by reading and executing the programs incorporated in the circuitry thereof.

Figure 3:
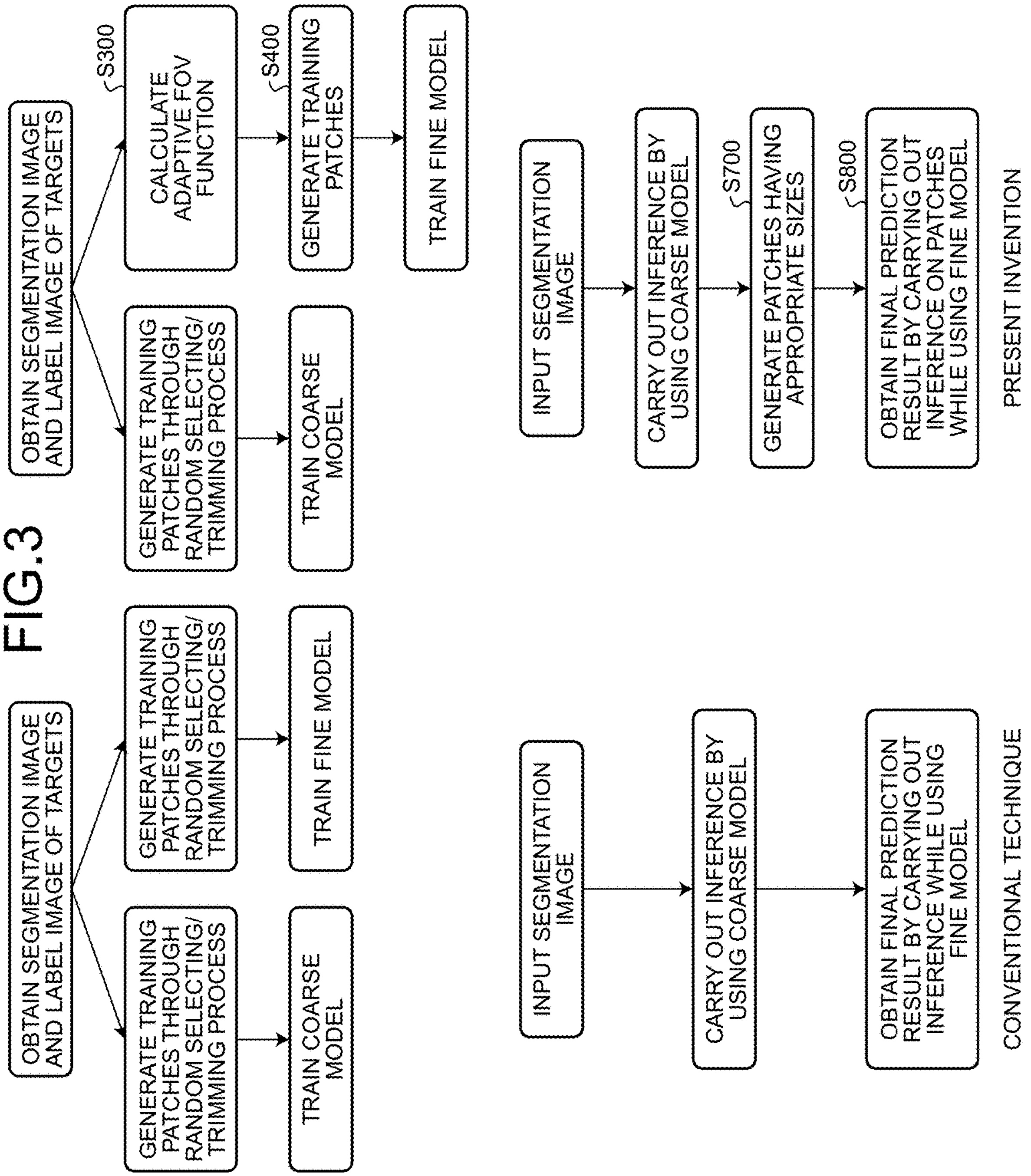
FIG. 3 is a comparison chart for explaining characteristics of processes performed by the image segmentation apparatus according to the embodiment.

FIG. 3 is a comparison chart for explaining characteristics of processes performed by the image segmentation apparatus according to the embodiment.

With reference to FIG. 3, the characteristics of the processes according to the present embodiment will be explained, using a comparison with a flow according to a conventional technique. On the left side of FIG. 3 is a flowchart for an image processing process according to the conventional technique. On the right side of FIG. 3 is a flowchart of the processes performed by the image segmentation apparatus according to the present embodiment.

As illustrated in FIG. 3, among the processes performed by the image segmentation apparatus according to the present embodiment, steps S300 and S400 in a training process and steps S700 and S800 in an inferring process are characteristics steps of the present embodiment. According to the conventional technique, in the training of a fine model, training patches are generated through a random selecting/trimming process, similarly to the training of a coarse model. In contrast, in the present embodiment, step S300 for calculating the adaptive FOV function (the variable FOV function) is added to the training of a fine model. Further, in the present embodiment, at step S400, patches having the sizes corresponding to the scales of the segmentation targets are generated, for the purpose of carrying out training using the adaptive FOV function calculated at step S300. For the inferring process also, in the segmentation process according to the present embodiment, step S700 is added to a fine model inference so that, similarly at this step, patches having appropriate sizes are obtained on the basis of a coarse inference result by using the variable FOV function, and the fine model inference is further carried out by using the patches having the appropriate sizes. In this situation, the processes at steps S700 and S800 in the inferring process are not requisite and may be omitted as appropriate. Details will be explained later.

By performing the processes in the characteristic steps described above, the image segmentation apparatus according to the present embodiment is configured, with respect to the multi-scale segmentation targets in the image, to calculate the variable FOV function that uses, as the variable, the statistical values of the shape features of the plurality of segmentation targets and to carry out the segmentation on the image after generating the patches having the corresponding sizes by using the generated variable FOV function. Consequently, the present embodiment is suitable for a segmentation task in which the segmentation targets have large differences in the scales and shapes thereof. With the present embodiment, it is possible to solve the technical problem where the precision level of the segmentation on small targets may be insufficient, whereas the segmentation on large targets may be incomplete. It is therefore possible to obtain a segmentation result with a high level of precision.

An outline of the processes performed by the image segmentation apparatus according to the present embodiment has thus been explained. Next, the present embodiment will be explained in detail by using examples of the semi-automatic segmentation and the fully-automatic segmentation.

First Embodiment

Figure 4:
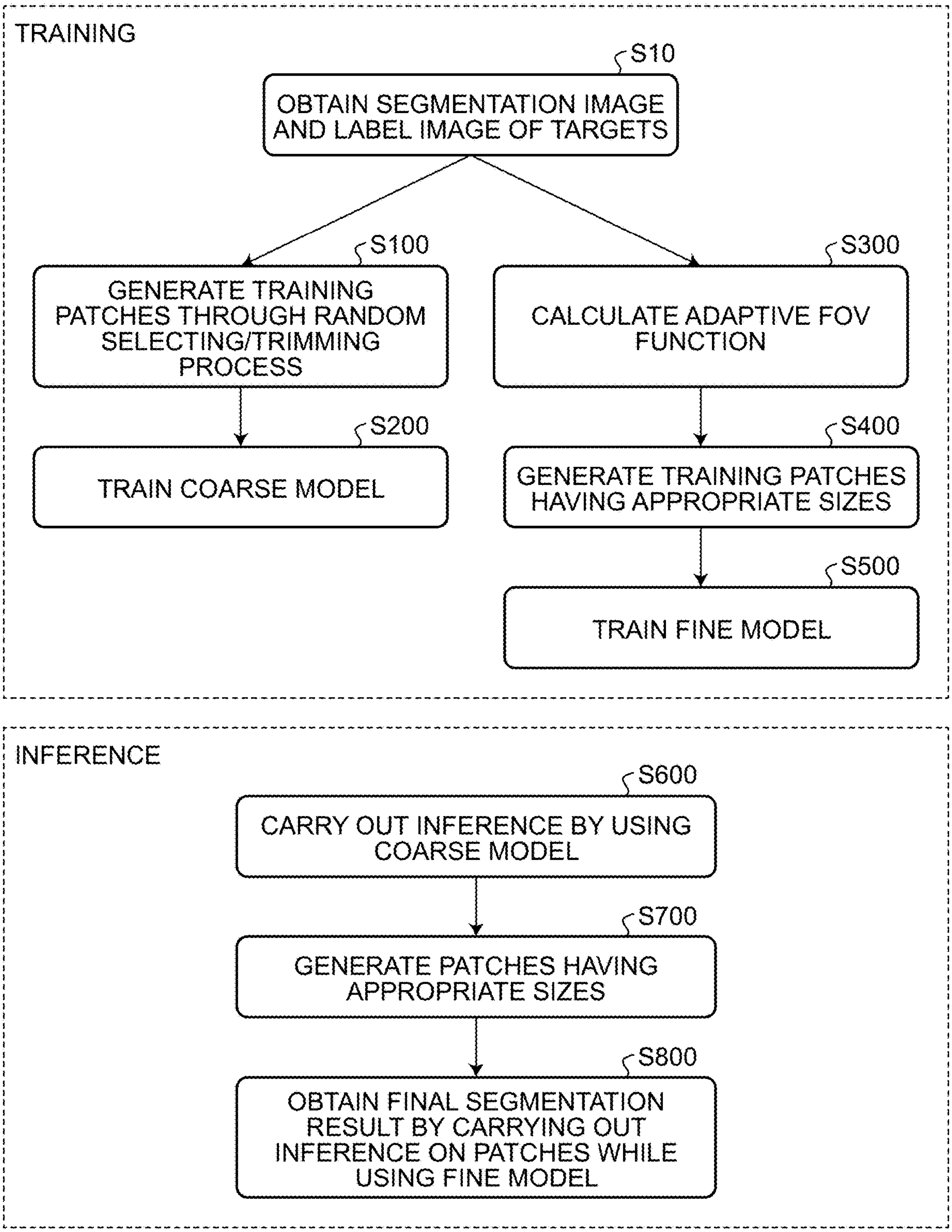
FIG. 4 is a flowchart illustrating an image segmentation process performed by an image segmentation apparatus according to a first embodiment.

As a first embodiment, the semi-automatic segmentation will be explained. FIG. 4 is a flowchart illustrating the first embodiment of an image segmentation process performed by an image segmentation apparatus according to the present embodiment. The image segmentation process can be divided into two main parts, namely, the training process and the inferring process. To begin with, processes in the training process will be explained, with reference to drawings.

In the training process, at first, at step S10, the image segmentation apparatus 1 receives an image to be segmented for a training purpose and a label image of the targets included in the image.

Subsequently, the image segmentation apparatus 1 trains the coarse model by performing steps S100 and S200.

More specifically, at step S100, the image segmentation apparatus 1 at first selects, for example, a foreground/background region to be trimmed with a certain percentage, and subsequently, trims the selected region to be trimmed at a fixed resolution, and is thus able to obtain patch images and patch labels. After that, the image segmentation apparatus performs pre-processing processes including a normalization operation or the like and thus generates training-purpose patches.

Subsequently, at step S200, the image segmentation apparatus 1 trains a coarse segmentation model by using the patch images and the patch labels obtained at step S100. It is possible to realize the coarse segmentation model by using a three dimensional (3D) U-Net model, for example.

Meanwhile, by performing steps S300 through S500, the image segmentation apparatus 1 according to the present embodiment trains the fine model.

More specifically, at step S300, by employing the variable FOV function calculating means 10, the image segmentation apparatus 1 calculates the variable FOV function for adaptively generating the FOVs that have the corresponding sizes, with respect to the plurality of segmentation targets that are on the mutually-different scales, the function using, as a variable, the statistical values obtained by statistically calculating the shape features of the plurality of segmentation targets on the mutually-different scales.

Next, details of step S300 will be explained, with reference to FIGS. 5A, 5B, 6A, and 6B.

Figure 5A:
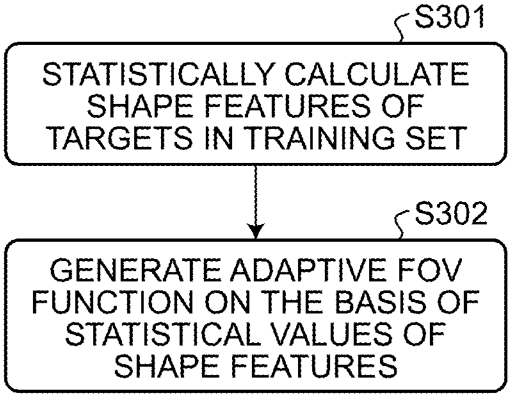
FIG. 5A is a flowchart illustrating a process performed by the image segmentation apparatus according to the first embodiment to calculate a variable FOV mathematical function.
Figure 5B:
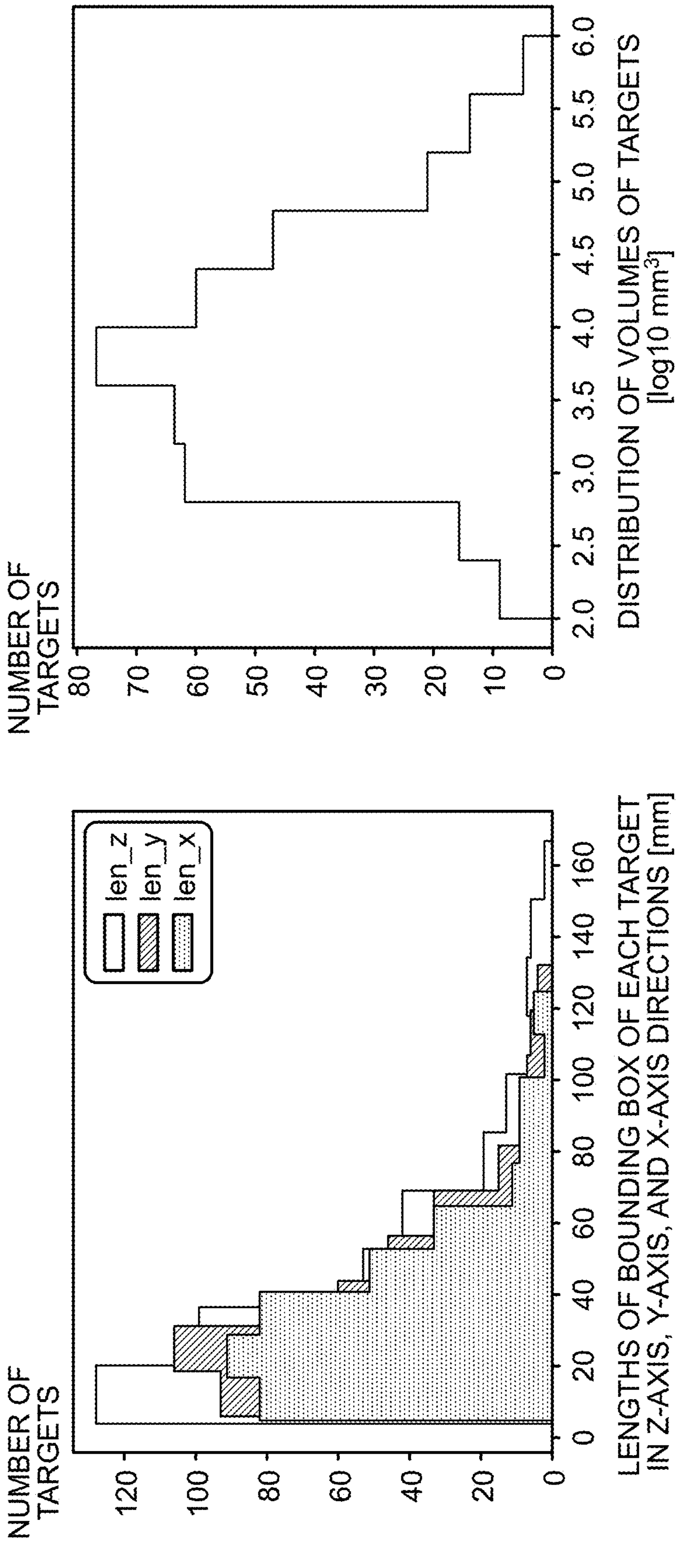
FIG. 5B presents schematic charts illustrating statistical values used by the image segmentation apparatus according to the first embodiment at the time of calculating the variable FOV mathematical function.

FIGS. 5A and 5B are schematic charts for explaining a process of calculating the adaptive FOV function. Between these drawings, FIG. 5A is a flowchart illustrating a process performed by the image segmentation apparatus according to the first embodiment to calculate the variable FOV function, whereas FIG. 5B is a schematic chart illustrating the statistical values used by the image segmentation apparatus according to the first embodiment at the time of calculating the variable FOV function.

As illustrated in FIG. 5A, step S300 may include steps S301 and S302. By performing steps S301 and S302, the variable FOV function calculating means 10 calculates the variable FOV function.

More specifically, to begin with, at step S301, the variable FOV function calculating means 10 obtains the statistical values by statistically calculating the shape features of the segmentation targets in a training set image. In this situation, the shape features are features related to the shapes of the segmentation targets and may preferably be scale features related to the scales of the segmentation targets. More specifically, the scale features may include the lengths, in different directions within a three-dimensional space, of a bounding box of each of the segmentation targets; the volume (a volume size) of each of the segmentation targets; the radius or the major and minor axes of each of the segmentation targets, and/or the like. As an example of the statistical values, FIG. 5B illustrates a distribution of the scale features of the targets. More specifically, the left section of FIG. 5B illustrates an example of a distribution of len_z, len_y, and len_x, which are the lengths of the bounding box of each of the targets in the z-axis, y-axis, and x-axis directions. The right section of FIG. 5A illustrates an example of a distribution of volumes of the targets.

The scale features of the segmentation targets are examples of the shape features. The lengths, in the different directions within the three-dimensional space, of the bounding box of each of the segmentation targets, the volume of each of the segmentation targets, the radius or the major and minor axes of each of the segmentation targets, and the like are examples of the scale features. The variable FOV function of the present embodiment is generated from the statistical values obtained by statistically calculating the shape features of the segmentation targets and use the statistical values as a variable thereof. In the process of generating the variable FOV function, the shape features related to the shapes of the segmentation targets may be used, so as to obtain necessary statistical values, by performing a data distribution statistical calculation such as that presented in FIG. 5B on the shape features.

Details of the shape feature statistics at step S301 will be clearly understood from a process of calculating the adaptive FOV function, which will be explained later with reference to FIGS. 6A and 6B.

The following will continue the description of FIG. 5A.

After step S301, the variable FOV function calculating means 10 calculates, at step S302, the variable FOV function on the basis of the statistical values of the shape features obtained at step S301.

The scheme used by the variable FOV function calculating means 10 for calculating the variable FOV function at step S302 may include, at least two schemes such as a scheme by which the variable FOV function is directly fitted from the statistical values of the shape features of the segmentation targets in the data set; and another scheme by which the variable FOV function is obtained by learning the statistical values of the shape features.

Next, details of the process at step S302 according to the two schemes will be explained, with reference to FIGS. 6A and 6B.

Figure 6A:
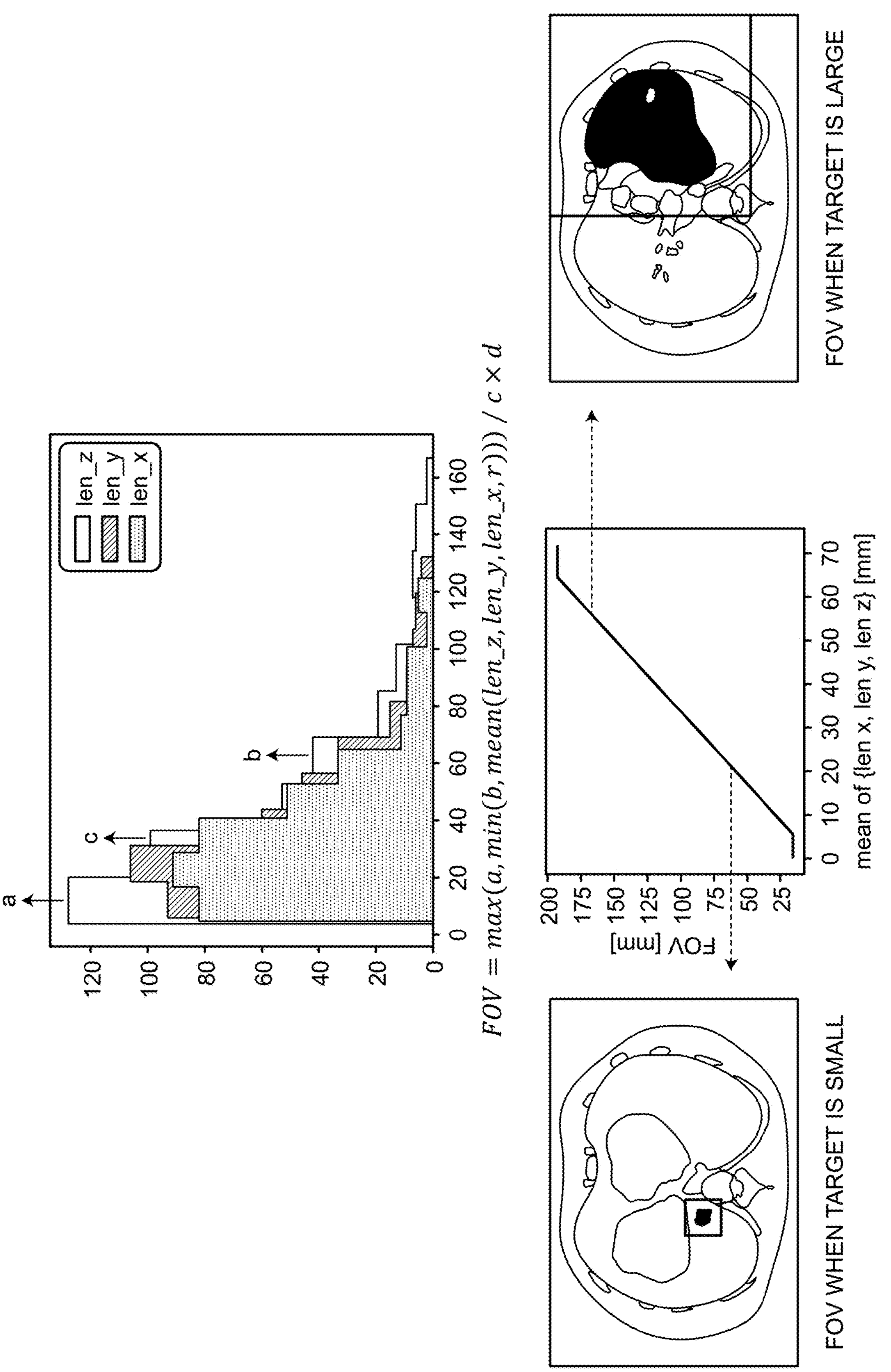
FIG. 6A presents schematic charts illustrating a first scheme of the process performed by the image segmentation apparatus according to the first embodiment to calculate the variable FOV mathematical function.

FIG. 6A presents schematic charts illustrating the first scheme of the process performed by the image segmentation apparatus according to the first embodiment to calculate the variable FOV function.

In an example of the first scheme in FIG. 6A used by the image segmentation apparatus according to the first embodiment to calculate the variable FOV function, the variable FOV function calculating means 10, at step S302, designs, through a fitting process, the variable FOV function that uses the statistical values of the shape features of the targets included in the data set obtained at step S301 as a variable and uses FOV sizes as values of the function. Parameters of the variable FOV function may be set in accordance with the statistical values.

It is preferable to configure the variable FOV function calculating means 10 so as to use a monotonously increasing linear function, as the variable FOV function. In other words, it is preferable to configure the variable FOV function calculating means 10 so as to design the variable FOV function in such a manner that the larger the statistical value of a shape feature of a target is, the larger is the FOV size. More preferably, the variable FOV function calculating means 10 may be configured to use, as the variable FOV function, a piecewise linear function as illustrated in FIG. 6A in which the value of the function does not change when the variable is at either a minimum or a maximum, but the value of the function monotonously increases when the variable is between a minimum value and a maximum value.

In the first embodiment illustrated in FIG. 6A, used as the statistical values for generating the piecewise linear function is an average value "mean(len_z,len_y,len_x)" of len_z, len_y, and len_x, which are the lengths of the bounding boxes of the targets in the z-axis, y-axis, and x-axis directions. In other words, the piecewise linear function presented as an example in FIG. 6A is a function FOV that uses the average value "mean(len_z,len_y,len_x)" of len_z, len_y, and len_x of the targets as a variable and that uses sizes of the FOVs as values of the function. In this situation, parameters of the function FOV are set in accordance with the statistical values so as to exhibit characteristics where the size of the FOV is constant in the vicinity of the two ends of the horizontal axis, i.e., when the average value "mean (len_z,len_y,len_x)" of len_z, len_y, and len_x is smaller than the minimum value and is larger than the maximum value and where the size of the FOV monotonously and linearly increases as the average value "mean(len_z,len_y, len_x)" of len_z, len_y, and len_x increases, in an intermediate part of the horizontal axis, i.e., when the average value "mean(len_z,len_y,len_x)" of len_z, len_y, and len_x is between the minimum value and the maximum value.

It is possible to express the piecewise linear function FOV having the above characteristics by using Expression (1) presented below:

$$\text{FOV}=\max(a,\min(b,\text{mean}(\text{len\_}z,\text{len\_}y,\text{len\_}x)))/c\times d \quad (1)$$

In the above expression, FOV denotes the size of the FOV. The notations len_z, len_y, and len_x denote the lengths of the segmentation target in the z direction, the y direction, and the x direction within the three-dimensional space, respectively. The parameters a, b, and c denote adjustable hyperparameters related to a statistical value ("mean(len_z, len_y,len_x)" in the present example) of the scale features.

In Expression (1), the letters a and b represent a minimum value and a maximum value of the statistical value variable at two inflection points in the piecewise linear function, respectively. The letter c represents an intermediate value among the statistical values, while "b>c>a" is satisfied. The parameter d is used for the purpose of ensuring an appropriate space between the field of view FOV and the segmentation target. The parameter d may also be referred to as a space adjustment parameter.

Next, a principle will be explained in detail, as to how the piecewise linear function presented in Expression (1) is able to adaptively generate the FOVs having the corresponding sizes, with respect to the segmentation targets that are on the mutually-different scales.

As illustrated in FIG. 6A, according to Expression (1), when the variable satisfies "mean(len_z,len_y,len_x)>b", i.e., when the average value of len_z, len_y, and len_x is larger than the maximum value b, the item "min(b,mean (len_z,len_y,len_x))" in Expression (1), i.e., the result of seeking for a minimum value between b and mean(len_z, len_y,len_x) can be expressed as presented below:

$$\min(b, \text{mean}(\text{len\_z}, \text{len\_y}, \text{len\_x})) = b$$

In this situation, because "b>a" is true, the item "max(a, min(b,mean(len_z,len_y,len_x)))" in Expression (1), i.e., the result of seeking for a maximum value between a and "min(b,mean(len_z,len_y,len_x))=b" can be expressed as presented below:

$$\max(a, \min(b, \text{mean}(\text{len\_z}, \text{len\_y}, \text{len\_x}))) = \max(a, b) = b$$

In other words, when "mean(len_z,len_y,len_x)>b" is satisfied, i.e., when the average value of len_z, len_y, and len_x is larger than the maximum value b, Expression (1) can be written as presented below:

$$FOV = \max(a, \min(b, \text{mean}(\text{len\_z}, \text{len\_y}, \text{len\_x})))/c\times d = b/c\times d$$

In contrast, when "mean(len_z,len_y,len_x)<a" is satisfied, i.e., when the average value of len_z, len_y, and len_x is smaller than the minimum value a, because "b>a" is true, "mean(len_z,len_y,len_x)<b" is inevitably satisfied. Thus, the item "min (b,mean(len_z,len_y,len_x))" in Expression (1) can be written as presented below:

$$\min(b, \text{mean}((\text{len\_z}, \text{len\_y}, \text{len\_x}))) = \text{mean}(\text{len\_z}, \text{len\_y}, \text{len\_x})$$

Furthermore, because "mean(len_z,len_y,len_x)<a" is satisfied, the following is true:

$$\max(a,\min(b,\text{mean}(\text{len\_}z,\text{len\_}y,\text{len\_}x)))=a$$

In other words, when "mean(len_z,len_y,len_x)<a" is satisfied, i.e., when the average value of "len_z", len_y, and len_x is smaller than the minimum value a, Expression (1) can be written as presented below:

$$FOV = \max(a, \min(b, \text{mean}(\text{len\_z}, \text{len\_y}, \text{len\_x})))/c \times d = a/c \times d$$

In another situation, when "mean(len_z,len_y,len_x)" falls between a and b, i.e., when the average value of len_z, len_y, and len_x falls between the minimum value a and the maximum value b, because "mean(len_z,len_y,len_x)≤b" is satisfied, the following is true:

$$\min(b, \text{mean}(\text{len\_}z, \text{len\_}y, \text{len\_}x)) = \text{mean}(\text{len\_}z, \text{len\_}y, \text{len\_}x)$$

Further, because "mean(len_z,len_y,len_x)≥a" is satisfied, the following is true:

$$\max(a, \min(b, \text{mean}(\text{len\_z}, \text{len\_y}, \text{len\_x}))) = \text{mean}(\text{len\_z}, \text{len\_y}, \text{len\_x})$$

In other words, when "a≤mean(len_z,len_y,len_x)≥b" is satisfied, i.e., when the average value of len_z, len_y, and len_x falls between the minimum value a and the maximum value b, Expression (1) can be written as presented below:

$$FOV = \max(a, \min(b, \text{mean}(\text{len\_z}, \text{len\_y}, \text{len\_x})))/c \times d = \text{mean}(\text{len\_z}, \text{len\_y}, \text{len\_x})/c \times d$$

Consequently, it is possible to simplify Expression (1) into the piecewise function presented below:

$$FOV = \max(a, \min(b, \text{mean}(\text{len\_z}, \text{len\_y}, \text{len\_x})))/c \times d = \begin{cases} a/c \times d & \text{if } \text{mean}(\text{len\_z}, \text{len\_y}, \text{len\_x}) < a \\ b/c \times d & \text{if } \text{mean}(\text{len\_z}, \text{len\_y}, \text{len\_x}) > b \\ \text{mean}(\text{len\_z}, \text{len\_y}, \text{len\_x})/c \times d & \text{if } a \le \text{mean}(\text{len\_z}, \text{len\_y}, \text{len\_x}) \le b \end{cases}$$

In other words, the variable FOV function "FOV" presented in Expression (1) is the piecewise linear function that uses, as the variable, the average value "mean(len_z,len_y, len_x)" of len_z, "len_y", and len_x. When the variable "mean(len_z,len_y,len_x)" is either smaller than the minimum value a or larger than the maximum value b, the size of the FOV is fixed to "a/c×d" or "b/c×d", respectively. When the variable "mean(len_z,len_y,len_x)" falls between the minimum value a and the maximum value b, the size of the FOV linearly increases as "mean(len_z,len_y,len_x)" increases.

Next, a method for setting the hyperparameters a, b, c, and d in the first embodiment will be explained in detail.

In the first embodiment illustrated in FIG. 6A, the minimum value a is, for example, the 10% quantile of a distribution of the lengths of all the segmentation targets in the training set, i.e., the value of the length at the first decile. The maximum value b is, for example, the 90% quantile of the distribution of the lengths of all the segmentation targets in the training set, i.e., the value of the length at the 9th decile. The intermediate value c is, for example, the value of the length corresponding to the median of the distribution of the lengths of all the segmentation targets in the training set. Due to the intermediate value c being the median, the space adjustment parameter d is the product of a median resolution IR of the image and a matrix size "Patch_size" to be input to a deep learning model and can therefore be expressed as "d=IR×Patch_size".

Let us discuss an example in which the distribution of the lengths in the training data set is the lengths corresponding to the 100 consecutive integers in total in the range of "1 mm to 100 mm", while IR is "1 mm/pixel" and Patch_size is "96 pixels". In this situation, when "a=10 mm", "b=90 mm", and "c=50 mm" are satisfied, according to the above analyses, when the length of a target to be segmented is short (1 mm to 10 mm), "FOV=a/c×d=a/c×(IR×Patch_size)=10 mm/50 mm×(1 mm/pixel×96 pixels)=19.2 mm" is true. When the length of a target to be segmented is long (90 mm to 100 mm), "FOV=b/c×d=b/c×(IR×Patch_size)=90 mm/50 mm×(1 mm/pixel×96 pixels)=172.8 mm" is true. When the length of a target to be segmented is in the range of "10 mm to 90 mm", the FOV is in the range of "19.2 mm to 172.8 mm" and is a value that varies in proportion to the length of the target to be segmented. As a result, the adaptive FOV function of the present embodiment is the piecewise linear function presented in the bottom center of FIG. 6A. When a target to be segmented is on a small scale, the corresponding FOV is also small (the bottom left in FIG. 6A). When a target to be segmented is on a large scale, the corresponding FOV is also large (the bottom right in FIG. 6A). Thus, an appropriate space is maintained between the target to be segmented and the corresponding FOV. By generating the adaptive FOV function in this manner, it is possible to obtain FOVs having appropriate sizes corresponding to the scales of the targets to be segmented.

The specific settings of the hyperparameters a, b, c, and d explained above are merely examples, and possible embodiments are not limited to this example.

For instance, in the above example, the parameter a exhibits the value of the length at the 10% quantile of the distribution of the lengths of all the segmentation targets in the training set. The parameter b exhibits the value of the length at the 90% quantile of the distribution of the lengths of all the segmentation targets in the training set. The parameter c exhibits the value of the length corresponding to the median of the distribution of the lengths of all the segmentation targets in the training set. However, it is apparent that a and b, which represent the minimum value and the maximum value of the horizontal coordinates at the two inflection points in the piecewise linear function, may exhibit other values. For example, the parameter a may exhibit a value of the length at the 15% quantile, the 20% quantile, or the like of the distribution of the lengths of all the segmentation targets in the training set. The parameter b may exhibit a value of the length at the 85% quantile, the 80% quantile, or the like of the distribution of the lengths of all the segmentation targets in the training set. Similarly, besides being the median, the parameter c may exhibit, for example, other values reflecting an average value of the distribution of the lengths of all the segmentation targets in the training set or an average value of the entire scale features. In the above example, the parameter d denotes the product of the median resolution IR (e.g., 1 mm/pixel) of the image and the matrix size "Patch_size" (e.g., 96 pixels) to be input to the deep learning model. However, the parameter d is used for ensuring an appropriate space between the FOV and the segmentation target. Thus, although the median resolution IR of the image is determined as "1 mm/pixel", while the matrix size Patch_size to be input to the deep learning model is determined as "96 pixels" in the above example, possible embodiments are not limited to these examples. The median resolution IR of the image and the matrix size Patch_size to be input to the deep leaning model may have other values, as necessary. Further, in the first embodiment, the scale features of the targets to be segmented are the lengths of the bounding boxes, so that the parameter d is accordingly calculated as "d=IR×Patch_size". However, when an FOV function is set while using other scale features besides the lengths of the bounding boxes as a variable, the parameter d may exhibit other suitable values. The hyperparameters a, b, c, and d are applicable to the present embodiment, as long as the hyperparameters are capable of making adjustments related to the statistical values of the scale features.

Further, in the above example in the first embodiment, the average value "mean(len_z,len_y,len_x)" of len_z, len_y, and len_x being the lengths of the bounding box of each of the targets in the z-axis, y-axis, and x-axis directions is used as a statistical value, so as to use the average value as the variable and so as to design the variable FOV function on the basis of the average value. However, possible embodiments are not limited to this example. In addition to the lengths of the bounding box of each of the targets in the z-axis, y-axis, and x-axis directions, an average value may statistically be calculated by taking the radius of each of the targets into account. In other words, the variable FOV function may be designed, by using, as the statistical values, the lengths of the bounding box of each of the targets in the z-axis, y-axis, and x-axis directions and the radius, i.e., "mean(len_z,len_y, len_x,r)" expressing an average value of len_z, len_y, and len_x, and r. In this situation, it is possible to express a piecewise linear function of the variable FOV function by using Expression (2) presented below:

$$FOV = \max(a, \min(b, \text{mean}(\text{len\_z}, \text{len\_y}, \text{len\_x}, r)))/c \times d \tag{2}$$

In Expression (2), FOV, len_z, len_y, len_x, a, b, c, and d are the same as those in the above embodiment referencing Expression (1). The letter r denotes the radius of the segmentation target.

Further, as the statistical values, it is possible to use, besides the average value, a median, a mode, a quartile, or the like, as appropriate in accordance with situations. Similarly, it is also possible to apply various modifications to the parameters of the variable FOV function and to the function format itself. To the present embodiment, it is possible to apply any linearly increasing function that is designed through a fitting process, while using the statistical values of the shape features of the targets to be segmented as a variable.

The first scheme of the process performed by the image segmentation apparatus according to the first embodiment to calculate the variable FOV function has thus been explained. Next, the second scheme of the process performed by the image segmentation apparatus according to the first embodiment to calculate the variable FOV function will be explained.

Figure 6B:
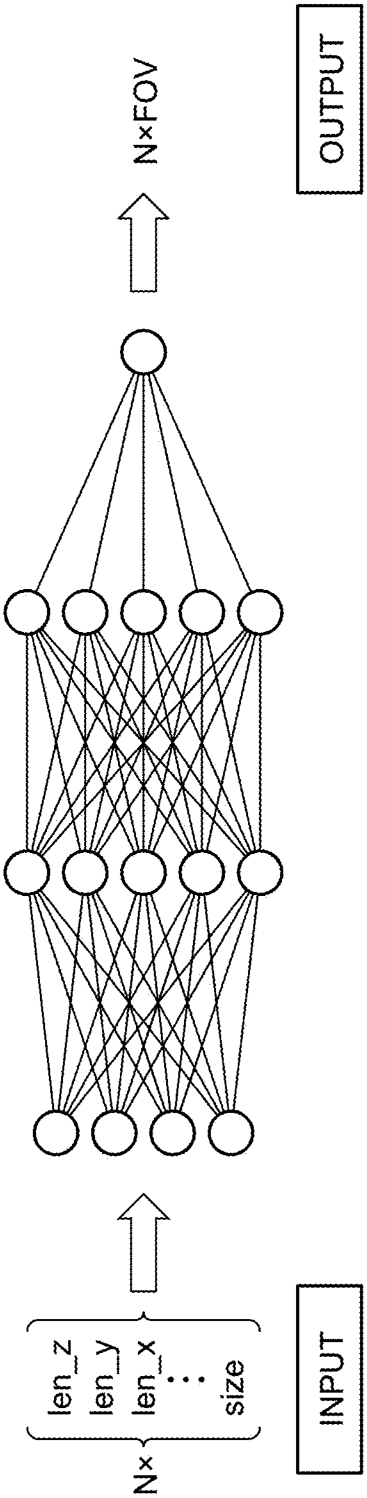
FIG. 6B presents schematic charts illustrating a second scheme of the process performed by the image segmentation apparatus according to the first embodiment to calculate the variable FOV mathematical function.

FIG. 6B presents schematic charts illustrating the second scheme of the process performed by the image segmentation apparatus according to the first embodiment to calculate the variable FOV function.

As illustrated in FIG. 6B, when the image segmentation apparatus according to the first embodiment calculates the variable FOV function, the variable FOV function in the second scheme is obtained through an automatic fitting process using a neural network.

For example, at step S302, the variable FOV function calculating means 10 is able to obtain an FOV function, by using the statistical values of the shape features obtained at step S301 as an input to the neural network and, while using an optimal FOV as a prediction goal, optimizing differences between predicted values and the optimal FOV as a loss function ("loss").

According to the second scheme, the statistical values of the shape features serving as the input to the neural network may be, similarly to the first scheme, an average value of len_z, len_y, and len_x or an average value of len_z, len_y, len_x, and r. According to the second scheme the loss function "loss" serving as the input to the neural network may be determined as L1 loss or L2 loss.

The following will continue the description of the flow in FIG. 4. After step S300, the process proceeds to step S400. At step S400, the image segmentation apparatus 1 generates training-purpose patches having sizes corresponding to the scales of the targets to be segmented, by using the variable FOV function calculated at step S300.

Figure 7:
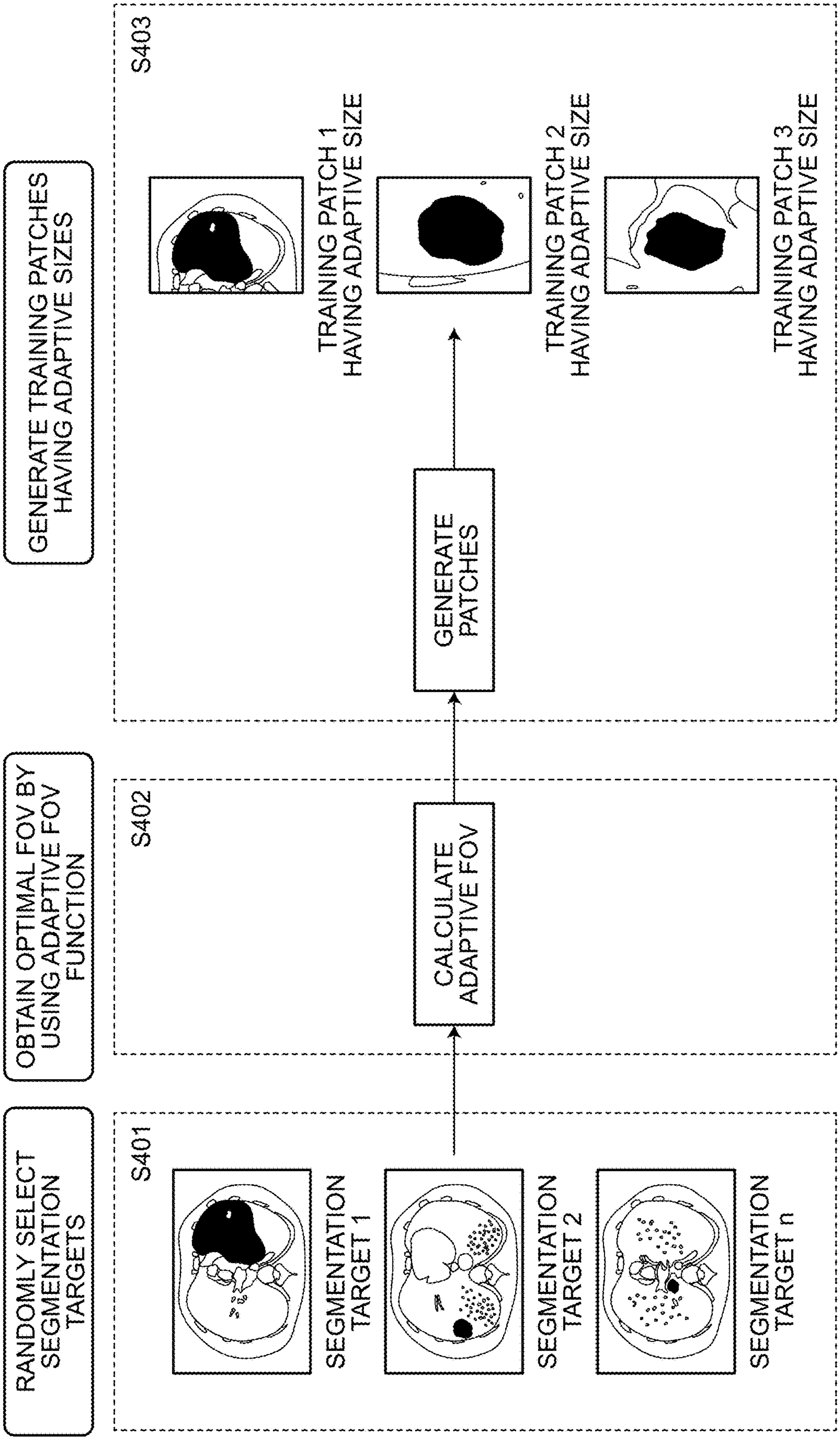
FIG. 7 is a schematic chart illustrating a process performed by the image segmentation apparatus according to the first embodiment to generate patches.

Next, details of step S400 will be explained, with reference to FIG. 7. FIG. 7 is a schematic chart illustrating a process performed by the image segmentation apparatus according to the first embodiment to generate the patches having appropriate sizes.

In the example in FIG. 7, step S400 includes steps S401 through S403. At steps S401 through S403, the training means 30 generates the training-purposes patch having the appropriate sizes. More specifically, at step S401, the training means 30 randomly selects n targets to be segmented from the training set. As the n targets to be segmented, FIG. 7 illustrates segmentation target 1, segmentation target 2, and segmentation target n. As illustrated in FIG. 7, segmentation target 1, segmentation target 2, and segmentation target n are three segmentation targets of which the scales are evidently different. Although FIG. 7 illustrates only the three segmentation targets, the training means 30 may also select four or more segmentation targets.

Subsequently, at step S402, the training means 30 uses the variable FOV function calculated at step S300 on segmentation target 1, segmentation target 2, . . . , and segmentation target n, so as to assign the shape features of the segmentation targets to the variable FOV function as a variable, and thus obtains FOVs called FOV1, FOV2, . . . , and FOVn that respectively correspond to the segmentation targets. Because the details and the advantageous effects of the process at step S402 for calculating the FOVs having appropriate sizes, by using the variable FOV function while using the shape features of the segmentation targets as the variable were explained in detail above with reference to FIGS. 6A and 6B, explanations thereof will be omitted.

After that, at step S403, the training means 30 generates, for use in training, patch 1, patch 2, . . . , and patch n, by using the FOVs called FOV1, FOV2, . . . , and FOVn that have the appropriate sizes and were calculated at step S402 with respect to segmentation target 1, segmentation target 2, . . . , and segmentation target n. For the process of generating the patches at step S403, it is possible to adopt an arbitrary method that is publicly known in the relevant field. For example, it is possible to obtain the training-purpose patches having the sizes corresponding to the scales of the segmentation targets, through a trimming process that uses the center of gravity of each segmentation target as the center and uses the FOVs called FOV1, FOV2, . . . , and FOVn as goal sizes. Because details of the process of generating the training patches can be realized by using various conventional methods, further detailed explanations will be omitted.

The following will continue the description of the flow in FIG. 4. After step S400, the process proceeds to step S500. At step S500, the image segmentation apparatus 1 trains a fine segmentation model, by using the training-purpose patches that have the appropriate sizes corresponding to the scales of the targets to be segmented and were obtained at step S400 and a label image of the corresponding targets. In the first embodiment, it is desirable to use 3D U-Net as the fine segmentation model.

Because the deep leaning model and the neural network training can be realized by using various conventional methods, details explanations thereof will be omitted.

The training process in the image segmentation process according to the first embodiment has thus been explained. Next, an inferring process in the image segmentation process will be explained.

In the inferring process in the image segmentation process according to the first embodiment, by performing steps S600 through S800 presented in FIG. 4, the inferring means 40 carries out an inference on an image by using the segmentation model trained by the training means 30, so as to obtain a final segmentation result.

In a preferable mode, the inferring means 40 may include a first segmentation means and a second segmentation means. The first segmentation means carries out an inference on the image by using the coarse model (a first segmentation model) at step S600, so as to obtain a coarse inference result (a first segmentation result). At step S700, on the basis of the coarse inference result (the first segmentation result), the second segmentation means generates a first segmentation result patch having an appropriate size, by using the variable FOV function calculated by the variable FOV function calculating means. Further, at step S800, an inference is carried out on the first segmentation result patch by using the fine segmentation model (a second segmentation model), so as to obtain the final segmentation result. The first segmentation means and the second segmentation means may be referred to as a first segmentation unit and a second segmentation unit, respectively.

Figure 8:
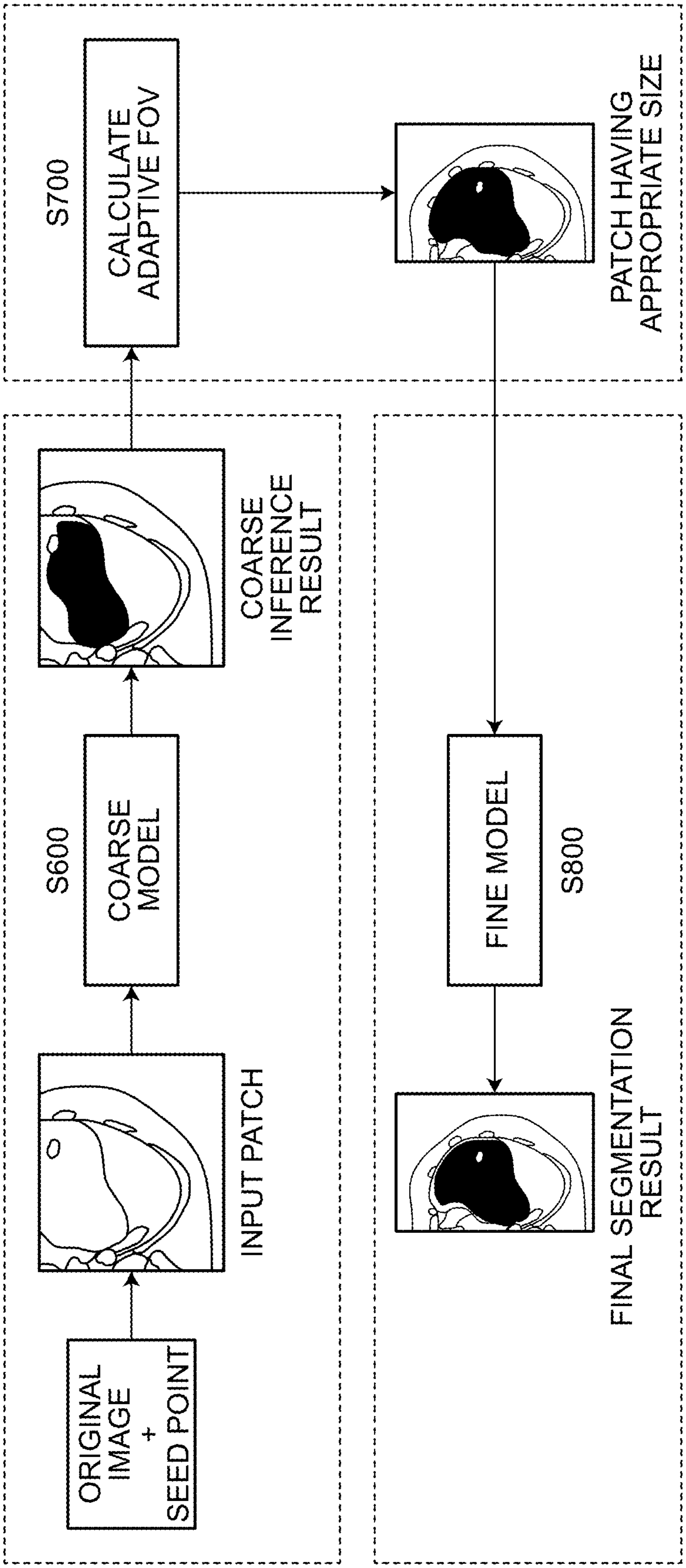
FIG. 8 is a schematic chart illustrating an inferring process in the image segmentation process according to the first embodiment.

Next, the inferring process in the image segmentation process according to the first embodiment will be explained in detail, with reference to FIG. 8. FIG. 8 is a schematic chart illustrating detailed processes in the inferring process in the image segmentation process.

In the inferring process illustrated in FIG. 8, to begin with, the inferring means 40 carries out a coarse model inference at step S600 and obtains a coarse inference result. The coarse inferring process may realize the inference by inputting an original image and a seed point to a coarse inference model, for example. More specifically, for example, the user designates a seed point of a target to be segmented, trims a patch having a fixed size while placing the seed point at the center, and inputs the trimmed result to the coarse segmentation model, so that the coarse segmentation model performs a predicting process to obtain the coarse inference result.

Because the coarse model inference can be realized by using various conventional methods, further detailed explanations thereof will be omitted.

Subsequently, at step S700, the inferring means 40 calculates an FOV having an appropriate size called "FOV" by using the variable FOV function on the coarse inference results obtained at step S600 and generates a patch having an appropriate size. Because the process at step S700 is similar to step S400 in the training process, in particular, the processes at steps S402 and S403, detailed explanations thereof will be omitted.

After that, at step S800, the inferring means 40 inputs the patch that has the appropriate size and was obtained at step S700 to the fine segmentation model, so that the fine segmentation model performs a predicting process and thus obtains the final segmentation result.

As explained above, with respect to the multi-scale segmentation targets in the image, the image segmentation apparatus according to the present embodiment calculates, in the training process at first, the variable FOV function that uses the statistical values of the shape features of the plurality of segmentation targets, as the variable. Further, with respect to the multi-scale segmentation targets in the image, the image segmentation apparatus according to the present embodiment generates, in the inferring process, the patch having the corresponding size by using the generated variable FOV function and subsequently carries out the image segmentation by using the model trained in the training process. Consequently, according to the present embodiment, it is possible to adaptively carry out the segmentation on the multi-scale targets to be segmented.

As mentioned earlier, in a semi-automatic medical image segmentation task, when too large an FOV is designated, the precision levels of segmentation for small targets tend to be insufficient, and computation resources may be spent wastefully. Conversely, when too small an FOV is designated, coverage of the targets tends to be incomplete.

In conventional techniques, to solve the abovementioned problem, a number of countermeasures have been taken in image segmentation. Specific examples of the countermeasures include a sliding window technique by which an inference is carried out by dividing an entire image into patches of a fixed size in a sliding window format so that a segmentation result for all the targets is obtained by integrating together inference results of the patches. Another example of the countermeasures is hierarchical segmentation by which models having mutually-different (coarse-to-fine) segmentation precision levels are employed. In the hierarchical segmentation, usually the mutually-different models are trained by using images having two mutually-different resolution levels. Coarse models generally have a low resolution, have a large FOV, and are excellent in segmenting large targets. Fine models generally have a high resolution, have a small FOV, and are excellent in segmenting small targets.

As explained above, no matter which method is used, according to the conventional techniques, it is often the case with image segmentation that a same processing method is applied to all the targets, without taking into consideration the scale differences among the segmentation targets. Thus, the problem remains where an FOV tends to be insufficient for large segmentation targets and the segmentation tends to be incomplete, whereas the FOV tends to be too large for small segmentation targets, and the precision levels of the segmentation tend to be insufficient.

In relation to the above, according to conventional medical imaging techniques such as, for example, techniques related to X-ray diagnoses and endoscope imaging, it is possible to change the size of an imaged region by performing a zoom process where the imaging distance is varied by moving an imaging table or an imaging apparatus. Also, in daily image interpretation activities of medical doctors, it is possible to select an appropriate observation field of view by enlarging or reducing images.

Thus, for processes of medical image segmentation based on machine learning and the like, there is a demand for a technique capable of obtaining segmentation results with high levels of precision, by adaptively selecting FOVs on the basis of mutually-different scales of the segmentation targets, to be able to automatically enlarge a small target or reduce a large target in an observation field of view, similarly to the image interpretation activities performed by medical doctors.

To meet the demand described above, the present embodiment makes it possible to adaptively carry out segmentation on the multi-scale targets to be segmented. In other words, according to the present embodiment, it is possible to solve the technical problem where the precision levels of segmentation for small targets tend to be insufficient, whereas the segmentation of large targets tends to be incomplete. It is therefore possible to obtain segmentation results having high levels of precision.

The inferring process according to the first embodiment has thus been explained. However, possible embodiments are not limited to this example. It is acceptable to apply various modifications to the inferring process in the image segmentation process of the present embodiment.

For example, after step S700, it is also acceptable to add a judging step for judging whether or not the FOV calculation result from step S700 is close to the FOV in the coarse model inference result from step S600. When the FOV calculation result from step S700 is close to the FOV in the coarse model inference result from step S600, it is possible to skip the fine model segmentation at step S800 and to use the coarse model segmentation result from step S600 as a final segmentation result without further processing. At that time, the calculation result based on the adaptive FOV method according to the present embodiment is used as a judgment criterion in the judgment step. Consequently, it is guaranteed that a segmentation result similarly having a high precision level is obtained. In addition, a beneficial advantageous effect is achieved where processing speed is increased while computation resources are saved.

There is a possibility that the FOV calculation result from step S700 may not be an optimal result in certain special situations where, for example, a segmentation target has a special shape, scale, or contrast. In those situations, there is a possibility that, if the segmentation result from step S800 were to be used as a final segmentation result, the precision level of the segmentation might not be satisfactory. To cope with those situations, the present embodiment may further provide a mode in which selected algorithms are supported. In other words, after step S800, a selecting step may be added so that, from between the coarse model inference result from step S600 and the fine model inference result from step S800, a better segmentation result is selected as a final segmentation result. For example, the selecting step may be realized by setting a prescribed threshold value in advance with respect to a technical index indicating a result of the inferring process, so that the index in the coarse model inference result and the index in the fine model inference are each compared with the threshold value or may be realized as a result of the user of the image segmentation apparatus 1 manually making the selection according to a predetermined standard.

It is possible to realize the judgment as to whether the FOV is close or not, the criterion for the judgment, the algorithm for selecting the segmentation result, and the criterion for the selection described above, by using various conventional methods. Because these aspects are not a main scope of the present embodiments, detailed explanations thereof will be omitted.

Unlike the conventional technique where an FOV of a coarse model is simply enlarged outwardly to a certain size, the variable FOV function calculating means according to the first embodiment is configured to calculate the adaptive FOV function through the fitting or the learning process, on the basis of the statistical values obtained by statistically calculating the shape features of all the targets in the entire data set and to further generate the corresponding FOV on the basis of the adaptive FOV function. Thus, the precision levels of the FOVs in the present embodiment are not dependent on the precision level of the coarse model. Even when the coarse model segmentation either has a low precision level or has failed, the FOV function obtained according to the present embodiment works properly and is capable of obtaining appropriate FOVs. It should be noted that the shape features used in the present embodiment do not necessarily need to be unique and may represent a single feature or a plurality of features. For example, the shape features used in the present embodiment may be scale features such as the lengths, in the different directions within the three-dimensional space, of the bounding box of each of the segmentation targets, the volume of each of the segmentation targets, the radius or the major and minor axes of each of the segmentation targets, or may be other shape features capable of characterizing the scales or the shapes of the targets.

According to the first embodiment explained above, it is possible to adaptively carry out the segmentation on the multi-scale segmentation targets, to thus solve the technical problem where the precision levels of the segmentation for small targets may be insufficient, whereas the segmentation for large targets may be incomplete, and to obtain segmentation results having high levels of precision.

On the basis of the technical concept according to the first embodiment described above, the inventor performed a test on segmentation of a medical image of a late-stage lung tumor and evaluated segmentation results. When a Dice Similarity Coefficient (DSC) was used as an evaluation standard, a segmentation result according to a conventional technique exhibited a DSC of "0.706". In contrast, a segmentation result according to the first embodiment exhibited a DSC of "0.774". Thus, the precision level of the segmentation of the present embodiment was evidently higher than that of the conventional technique.

Second Embodiment

The first embodiment was explained above about the semi-automatic process in which the inference is carried out by inputting, at step S600, the original image and the seed point to the inference model; however, possible embodiments are not limited to this example. For instance, the present disclosure is also applicable to fully-automatic segmentation.

As a second embodiment, an example will be explained in which an embodiment is applied to fully-automatic segmentation. In the following sections, the second embodiment will be explained in detail, with reference to FIG. 9.

In the description of the second embodiment, differences from the first embodiment will primarily be explained. In the description of the second embodiment, some of the constituent elements that are the same as those in the first embodiment will be referred to by using the same reference characters, and explanations thereof will be omitted.

Figure 9:
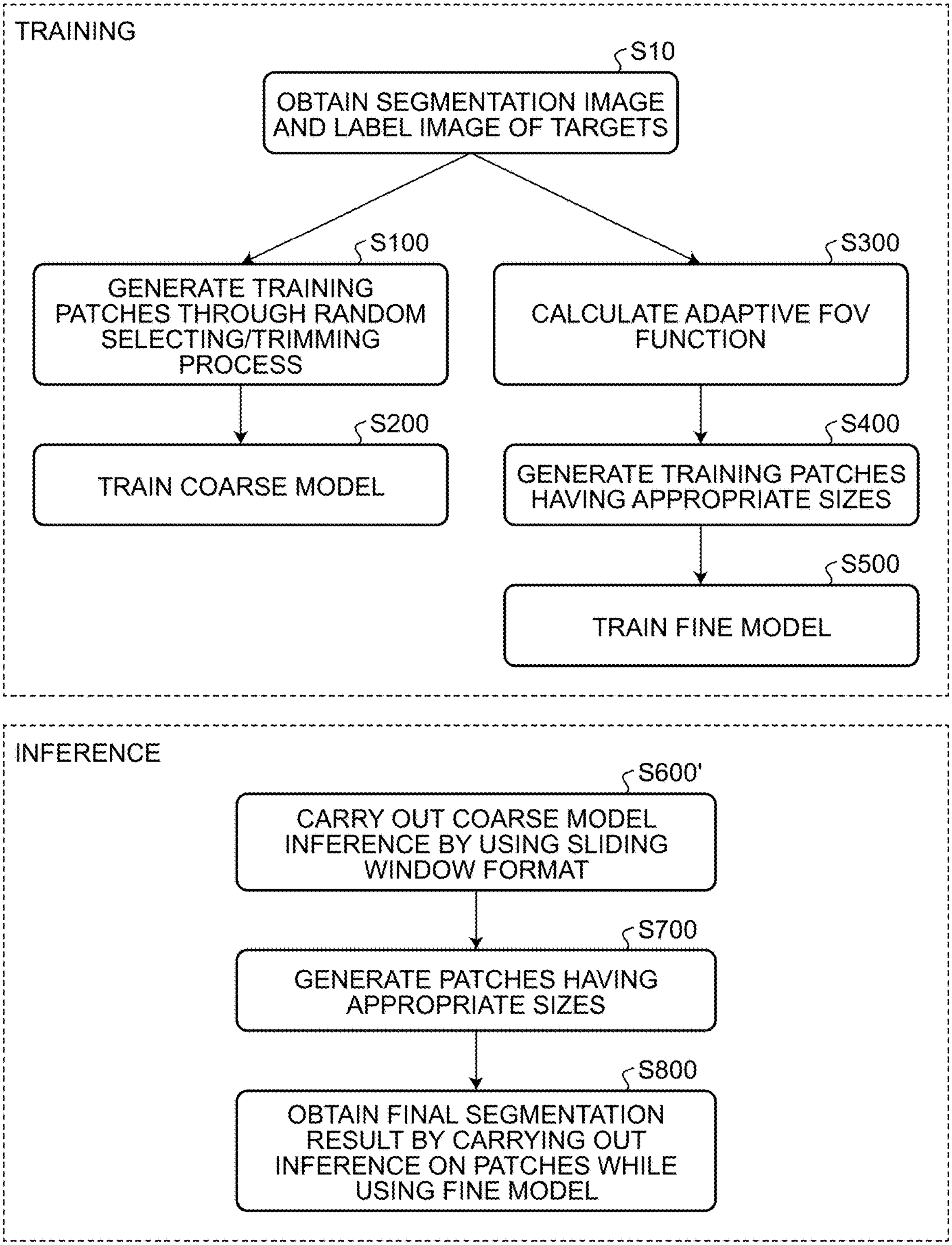
FIG. 9 is a flowchart illustrating an image segmentation process performed by an image segmentation apparatus according to a second embodiment.

FIG. 9 is a flowchart illustrating an image segmentation process performed by an image segmentation apparatus according to the second embodiment.

As illustrated in FIG. 9, in an inferring process according to the second embodiment, in the process at step S600', a coarse model inference is carried out fully automatically by using a sliding window format, unlike the process at step S600 in the first embodiment. In other words, in the inferring process according to the second embodiment, patches are obtained by carrying out traversal on the entire original image while using a sliding window, so as to obtain inference results of the patches by carrying out an inference on each of the patches. Further, a coarse inference result of the entire image is obtained by integrating together the inference results of the patches.

Because other steps in the image segmentation process according to the second embodiment are the same as those in the first embodiment, detailed explanations thereof will be omitted.

According to the second embodiment, it is possible to apply the embodiment to the fully-automatic segmentation and to also adaptively carry out the segmentation on the multi-scale segmentation targets. In this manner, it is possible to solve the technical problem where the precision levels of the segmentation for small targets may be insufficient, whereas the segmentation of large targets may be incomplete. It is therefore possible to obtain segmentation results having high levels of precision, similarly to the first embodiment.

On the basis of the technical concept according to the second embodiment described above, the inventor performed a test on segmentation of a medical image of kidney tumors and evaluated segmentation results. When a DSC was used as an evaluation standard, segmentation results from a single coarse segmentation and a gradual segmentation from coarse to fine according to a conventional technique exhibited DSCs of "0.825" and "0855", respectively. In contrast, a segmentation result according to the second embodiment exhibited a DSC of "0.867". Further, with respect to segmentation targets having mutually-different sizes, a gradual segmentation from coarse to fine according to the conventional technique exhibited DSCs of "0.768" and "0.838" for segmentation results using kidney tumors having a radius of "20 mm" or smaller and a radius of "40 mm" or smaller, respectively. In contrast, segmentation results according to the second embodiments exhibited DSCs of "0.811" and "0.860", respectively. Consequently, the precision levels of the segmentation according to the present embodiment were all higher than those of the conventional technique, with respect to the different schemes of segmentation and the different scales of the segmentation targets.

OTHER EMBODIMENTS

In the inferring process according to the first embodiment and the second embodiment, the processes based on the coarse model and the fine model at steps S600 (S600') through S800 represent a preferable embodiment; however, the processes at steps S700 and S800 are not requisite. In other words, at step S600 (S600'), it is also acceptable to carry out an inference on an image by using a model trained through the training process according to the embodiments and to further determine a segmentation result obtained thereby as a final inference result without further processing.

In the above description, the embodiment was explained in which the inference is carried out on the image by employing the trained model trained by the training means 30. However, the coarse segmentation model in the inferring process of the embodiments is applicable to an arbitrary existing segmentation model, as long as the model is capable of obtaining scale information of the targets to be segmented, such as a target detection model or a conventional model based on a threshold value segmentation method. Further, the coarse model segmentation may be manual segmentation. The coarse segmentation model according to the embodiments may be one selected from among a deep learning segmentation model, a landmark model, a target detection model, and a graph cut segmentation model.

Although the above embodiments were explained by using the examples of the segmentation, needless to say, the embodiments are applicable to other types of image processing besides the segmentation, such as detection, for example.

The embodiments are applicable to semi-automatic segmentation algorithms and fully-automatic segmentation algorithms. Further, the variable FOV function calculating means 10 according to the embodiments alone is applicable to other existing detection or segmentation models.

It is possible to realize any of the image processing, the segmentations, the training of the deep learning model and the neural network, and the inferences described above, by using various schemes in conventional techniques. Thus, detailed explanations thereof will be omitted.

The embodiments may be realized as the image segmentation apparatus 1 described above or may be realized as an image segmentation method, a program, or a medium storing therein an image segmentation program.

The image segmentation apparatus 1 of the present disclosure may be incorporated in the medical image diagnosis apparatus 2. Alternatively the image segmentation apparatus 1 alone may be configured to perform the processes. In that situation, the image segmentation apparatus 1 includes, as illustrated in FIG. 2, the processing circuitry 100 configured to perform the same processes as those in the steps described above; and the memory 200 configured to store therein the programs corresponding to the functions and various types of information. Further, the processing circuitry 100 is configured to obtain two-dimensional or three-dimensional medical image data from the medical image diagnosis apparatus 2 such as an ultrasound diagnosis apparatus or the image storing apparatus 3 via the network NW and to further perform the processes described above by using the obtained medical image data. In this situation, the processing circuitry 100 is a processor configured to realize the functions corresponding to the programs, by reading and executing the programs from the memory.

The term "processor" used in the above explanation denotes, for example, a Central Processing Unit (CPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). The processors are configured to realize the functions by reading and executing the programs saved in the memory. Instead of having the programs saved in the memory, it is also acceptable to directly incorporate the programs in the circuitry of the processors. In that situation, the processors are configured to realize the functions by reading and executing the programs incorporated in the circuitry thereof. The processors of the present embodiments do not each necessarily need to be structured as a single piece of circuitry. It is also acceptable to structure one processor by combining together a plurality of pieces of independent circuitry so that the functions thereof are realized.

The constituent elements of the apparatuses illustrated in the drawings for explaining the above embodiments are based on functional concepts. Thus, it is not necessarily required to physically configure the constituent elements as indicated in the drawings. In other words, specific modes of distribution and integration of the apparatuses are not limited to those illustrated in the drawings. It is acceptable to functionally or physically distribute or integrate all or a part of the apparatuses in any arbitrary units, depending on various loads and the status of use. Further, all or an arbitrary part of the processing functions performed by the apparatuses may be realized by a CPU and a program analyzed and executed by the CPU or may be realized as hardware using wired logic.

Further, it is possible to realize any of the processing methods explained in the above embodiments, by executing a processing program prepared in advance on a computer such as a personal computer or a workstation. It is possible to distribute the processing program via a network such as the Internet. Further, the processing program may be recorded in a non-transitory computer-readable recording medium such as a hard disk, a Flexible Disk (FD), a Compact Disk Read-Only Memory (CD-ROM), a Magneto Optical (MO) disk, a Digital Versatile Disk (DVD), or a flash memory such as a Universal Serial Bus (USB) memory or a Secure Digital (SD) card memory, so as to be executed as being read by a computer from the non-transitory recording medium.

According to at least one aspect of the embodiments described above, it is possible to improve precision levels of the image segmentation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image segmentation apparatus comprising processing circuitry configured:

to calculate a variable field-of-view mathematical function capable of adaptively generating fields of view having corresponding sizes, with respect to a plurality of segmentation targets included in an image;

to generate patches having corresponding sizes, with respect to the plurality of segmentation targets, by using the variable field-of-view mathematical function; and to obtain a segmentation result of the plurality of segmentation targets, by carrying out an inference on the image while using a segmentation model trained with the patches.

2. The image segmentation apparatus according to claim 1, wherein the processing circuitry is configured to perform:

a first segmentation process in which a first segmentation result is obtained by segmenting the image while using a first segmentation model; and a second segmentation process in which a first segmentation result patch is generated by using the variable field-of-view mathematical function on a basis of the first segmentation result, and the segmentation result is obtained by segmenting the first segmentation result patch while using a second segmentation model.

3. The image segmentation apparatus according to claim 1, wherein the variable field-of-view mathematical function uses, as a variable, a statistical value obtained by statistically calculating shape features of the plurality of segmentation targets having mutually-different sizes.

4. The image segmentation apparatus according to claim 3, wherein the shape features are scale features related to scales of the segmentation targets.

5. The image segmentation apparatus according to claim 4, wherein the scale features include at least one of: lengths of a bounding box of each of the segmentation targets in different directions within a three-dimensional space; volume of each of the segmentation targets; and major and minor axes of each of the segmentation targets.

6. The image segmentation apparatus according to claim 5, wherein, as the variable field-of-view mathematical function, the processing circuitry is configured to use a monotonously increasing linear function that is set on a basis of the scale features.

7. The image segmentation apparatus according to claim 6, wherein as the variable field-of-view mathematical function, the processing circuitry is configured to use a piecewise linear function expressed with the following expression:

$$FOV = \max(a, \min(b, \text{mean}(\text{len\_z}, \text{len\_y}, \text{len\_x})))/c \times d$$

where FOV denotes each of the fields of view, len_z, len_y, and len_x denote the lengths of each of the segmentation targets in a z-direction, a y-direction, and an x-direction, respectively, within the three-dimensional space, and a, b, c, and d denote adjustable hyperparameters related to the statistical values of the scale features.

8. The image segmentation apparatus according to claim 3, wherein the processing circuitry is configured to calculate the variable field-of-view mathematical function through an automatic fitting process by a neural network configured to receive an input of the shape features of the plurality of segmentation targets and to output the fields of view, and the processing circuitry is configured to calculate the variable field-of-view mathematical function by adjusting a loss function of the neural network so as to make the fields of view optimal.

9. The image segmentation apparatus according to claim 2, wherein the first segmentation model is a coarse segmentation model, whereas the second segmentation model is a fine segmentation model.

10. The image segmentation apparatus according to claim 9, wherein the coarse segmentation model is one of: a deep learning segmentation model, a landmark model, a target detection model, and a graph cut segmentation model.

11. An image segmentation method comprising:

calculating a variable field-of-view mathematical function capable of adaptively generating fields of view having corresponding sizes, with respect to a plurality of segmentation targets included in an image;

generating patches having corresponding sizes, with respect to the plurality of segmentation targets, by using the variable field-of-view mathematical function; and obtaining a segmentation result of the plurality of segmentation targets, by carrying out an inference on the image while using a segmentation model trained with the patches.

* * * * *